June 23, 1931.  J. R. GAMMETER  1,811,430
MOLD FILLING APPARATUS
Filed March 30, 1928  3 Sheets-Sheet 3
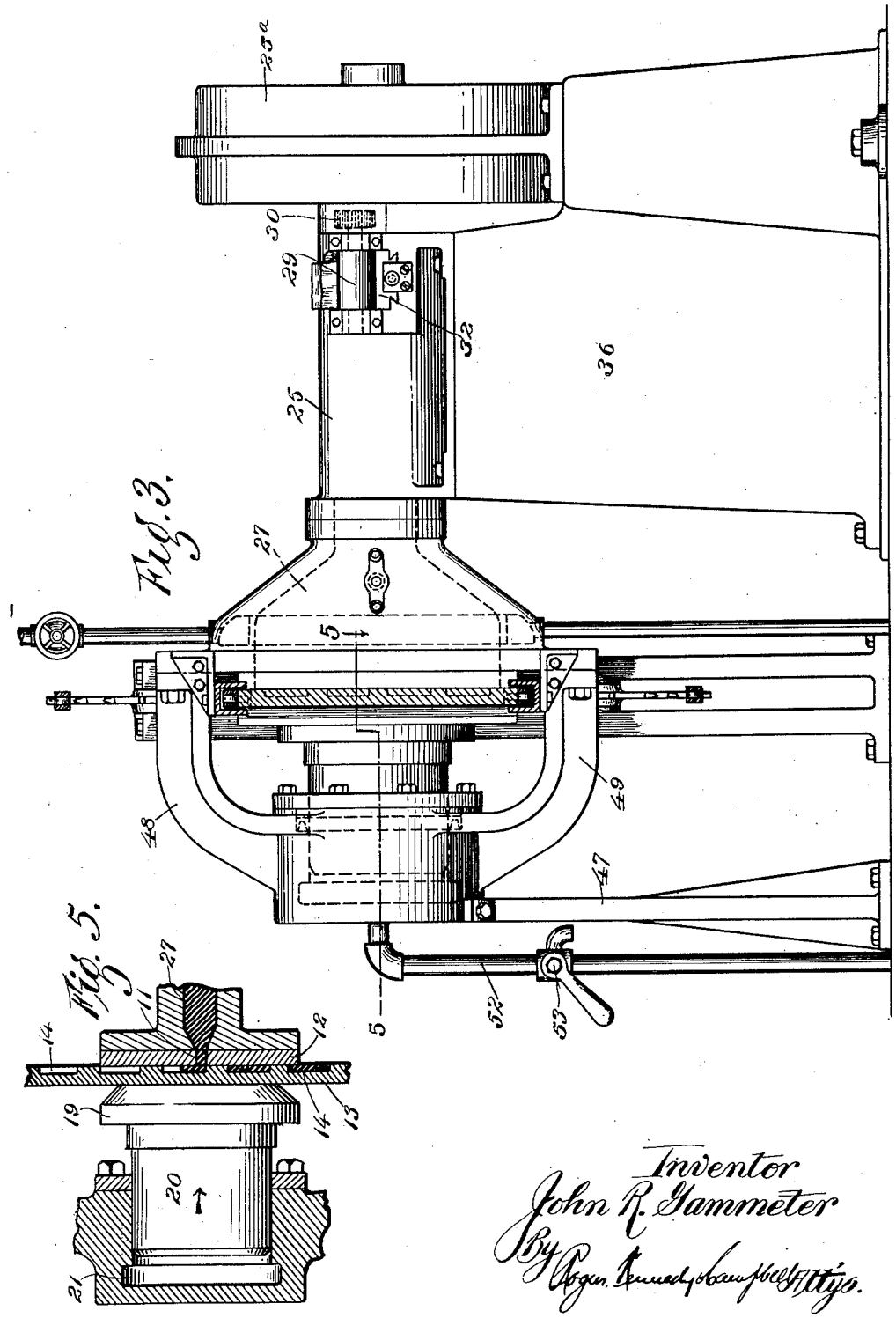
Inventor
John R. Gammeter
By
Rogers, Kennedy Campbell, Attys.

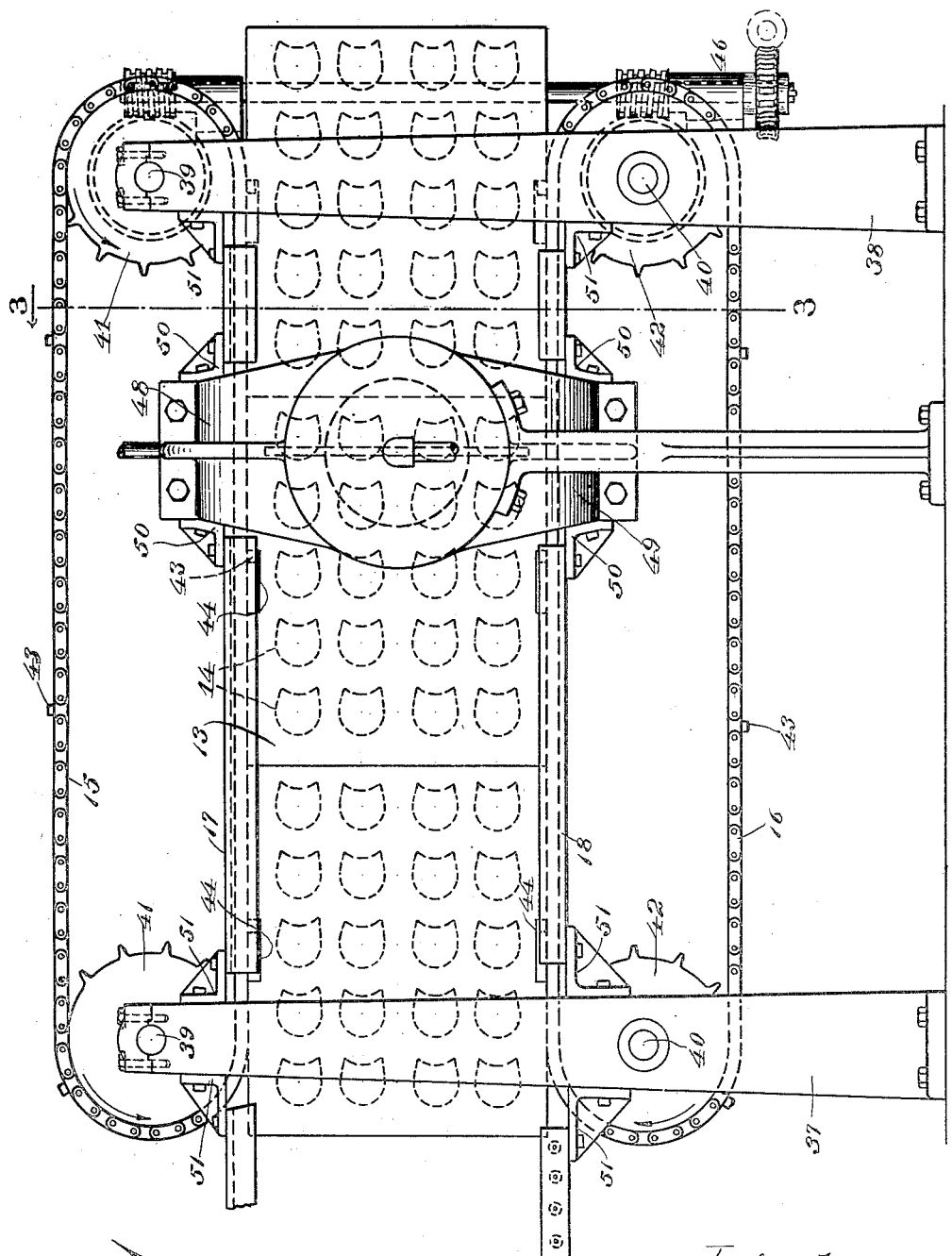

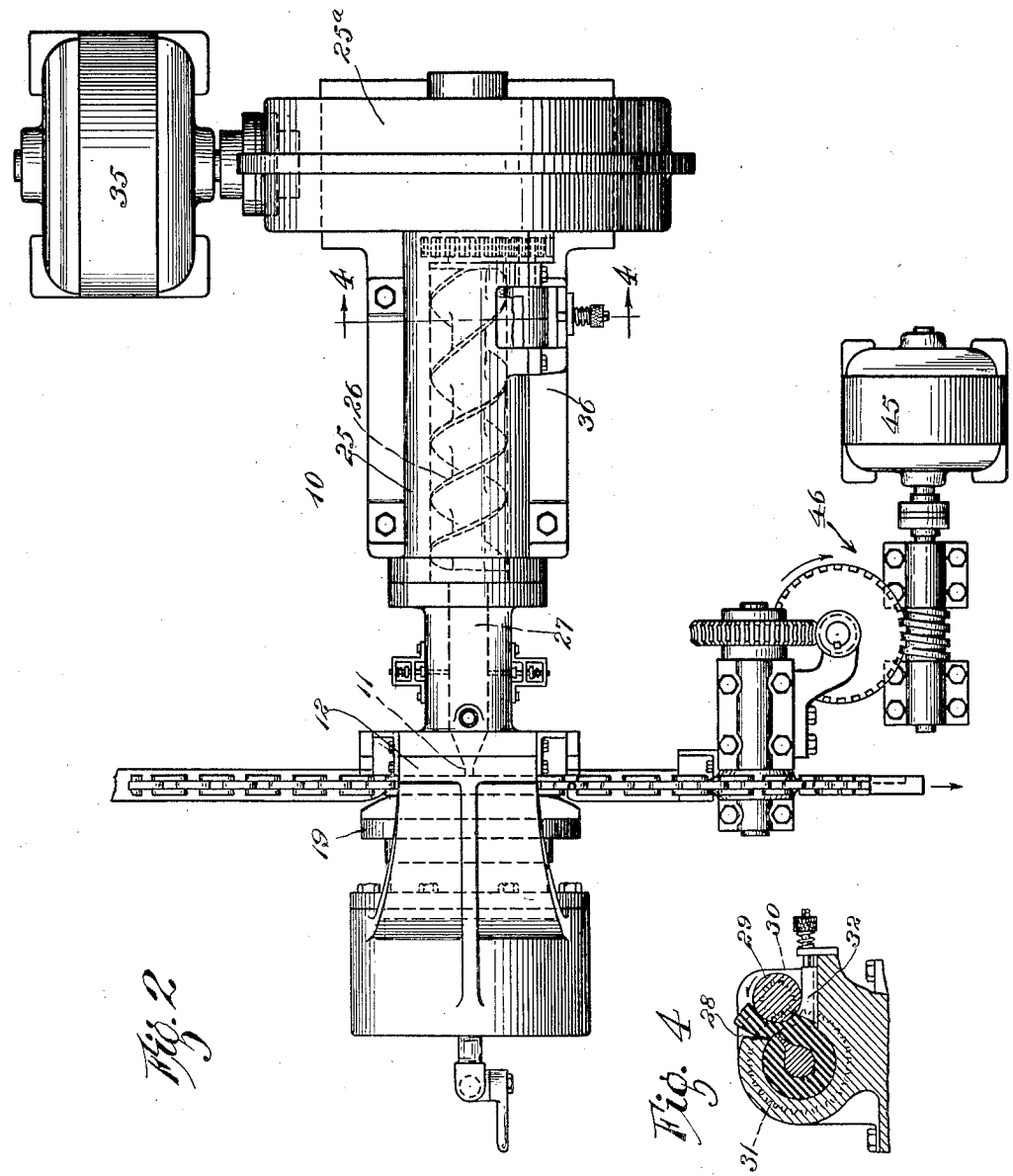

Patented June 23, 1931

1,811,430

UNITED STATES PATENT OFFICE

JOHN R. GAMMETER, OF AKRON, OHIO

MOLD FILLING APPARATUS

Application filed March 30, 1928. Serial No. 265,839.

This invention relates generally to the art of producing molded articles from plastic material such as unvulcanized rubber, and refers particularly to methods and apparatus for filling the molds directly from an extruding machine whereby to produce blanks of definite size and shape ready for immediate vulcanization.

An important object of the present invention is to provide a novel method for economically producing blanks for rubber heels and similar articles, and to provide improved apparatus for carrying out the steps of the method.

More specifically, the invention contemplates the extrusion of plastic rubber thru a die plate and directly into the molds, by means of a screw rotating within a cylinder which contains the gum stock. In order to exert sufficient pressure on the extruded material to completely fill the mold cavities, a roller is mounted adjacent the receiving end of the screw, in the inlet to the cylinder, and driven in such a manner as to positively feed the plastic gum stock to the screw at a substantially uniform speed and pressure, thus augmenting the pressure generated or applied by the screw when acting alone. The molds are each provided with a plurality of separate mold cavities adapted to be brought successively into registration with the extrusion orifice in the die plate, and are held firmly in surface contact with the die plate during the filling operation. Suitable conveying mechanism is provided for moving the molds transversely past the die opening with either a continuous or an intermittent motion, and as the successive mold cavities are moved out of communication with the die opening, the rubber is sheared off and held in the cavities under pressure and smoothed or ironed down by sliding contact with the die plate. In order to maintain the necessary surface contact between the molds and the die plate, and to compensate for slight variations in the thickness of the different molds, they are yieldingly held in position by a hydraulic ram which slidably engages the back of the mold in filling position and forces it against the die plate.

After all of the cavities of a mold are filled a cover plate may be applied, in which condition the assemblage may be placed in a vulcanizer of any suitable type, and subjected to heat sufficient to vulcanize the rubber.

The foregoing and other objects, features and advantages of the invention will be fully appreciated from the following description in connection with the accompanying drawings, wherein the invention has been shown by way of illustration, and wherein, Fig. 1 is an end view of a rubber heel filling machine embodying the invention;

Fig. 2 is a top plan view thereof;

Fig. 3 is a side elevation partly in section on line 3—3 of Fig. 1;

Fig. 4 is a transverse sectional view on line 4—4 of Fig. 2; and

Fig. 5 is a fragmentary horizontal sectional view on line 5—5 of Fig. 3.

In practicing the invention, an extruding machine 10 is employed to force plastic material, such as unvulcanized gum stock, thru a restricted orifice or slot 11 in a die plate 12, (heated in the usual way) against the outer face of which successive molds 13 are held for filling. The molds 13 are in the nature of relatively flat plates, each provided with a plurality of mold cavities 14 of desired size and shape, which cavities are arranged in series and adapted to be brought successively into registration with the die orifice 11 as the mold is moved transversely across the face of the die plate 12. During the filling operation, the cavities are closed except for communication with the orifice 11, and by virtue of this arrangement, each cavity will be completely filled with plastic rubber under pressure. Endless conveyor belts or chains 15 and 16 are employed for moving successive mold plates 13 either intermittently or continuously in a rectilinear path between spaced parallel guides or channels 17 and 18, and these conveyor belts or chains receive empty molds at one side of the machine and deliver filled molds at the other side. As the mold plates 13 pass the die plate 12, they are held in firm surface contact therewith by the yielding pressure of a ram 19 which is mounted on the outer end of a piston 20 operating in a cylinder 21, and this surface contact between the mold plate 13 and the die plate 12 insures a clean shearing action on the extruded stock as the cavities are carried beyond the limits of the discharge orifice 11. The die plate 12 is of sufficient width to keep the molded rubber confined in the cavities during part of the travel immediately after the filling operation, and due to its tendency to expand, the rubber has frictional contact with the face of the die plate and is smoothed off by this action.

The extruding machine 10 is of the rotary screw type having a cylinder 25 thru which the plastic rubber is propelled longitudinally by a rotary screw 26 which forces the rubber thru a pressure chamber 27, at the outer end of which the die plate 12 is mounted. In order to supplement the pressure generated by the screw 27, and to eliminate slippage and pocketing of air, an auxiliary feed mechanism is provided, at the stock entrance end of the cylinder 24, and this auxiliary feed mechanism is one of the important features of the invention. The plastic stock is or may be supplied in a continuous stream to the interior of the cylinder 25 thru an opening 28. Arranged within this opening is a feed roller 29 (Fig. 4), positively and continuously driven by a pinion 30 meshing with a gear 31 on the shaft of screw 26. The arrangement is such that the roller 29 rotates more rapidly than does the screw 26, and hence acts to keep the screw chamber filled with rubber under pressure at all times, thus insuring a uniform extrusion of the stock at higher pressure and freer from air than would be possible with the use of the screw alone. A knife or scraper 32 is mounted below the roller 29 and is yieldingly held against the surface of the roller by a compression spring 33, this scraper serving not only to keep the surface of the roller clean, but to prevent the rubber stock from flowing out of the cylinder below the roller.

Power may be supplied by an electric motor 35 for rotating the screw 26 thru the usual worm and worm gear, not shown, and such power simultaneously rotates the feed roller 29 thru the gears 30 and 31 as previously stated. The cylinder 25 and gear housing 25ª may be mounted on any desired pedestal or base 36, from which is spaced a pair of upright standards 37 and 38, supporting two upper conveyor shafts 39 and two lower conveyor shafts 40. The upper shafts 39 are each provided with a sprocket wheel 41 over which the conveyor chain 15 travels, and the lower shafts 40 are similarly provided with sprocket wheels 42 for accommodating the conveyor chain 16. At suitably spaced intervals, the chains 15 and 16 are provided with lugs 43 which are adapted to engage in recesses 44 in the opposite edges of the molds 13 to move the same along the guides 17 and 18. The sprockets 41 and 42 are rotated in opposite directions by an electric motor 45 thru suitable reduction gearing indicated generally at 46.

The cylinder 21 is preferably in axial alinement with the cylinder 25 and is supported at one end upon a pedestal 47 (Figs. 1 and 3), and at its other end by a pair of offset arms 48, 49 which are rigidly connected to the guide members 17 and 18 by means of bolted angle brackets 50. The guide members 17 and 18 are similarly connected by bolted angle brackets 51 to the standards 37 and 38 whereby to produce a simple yet rigid light-weight frame for the conveyor. Any desired fluid such as water, steam or air, under pressure, can be admitted to the interior of the cylinder 21 or drained therefrom thru a supply pipe 52 under the control of a manually operated valve 53.

From the foregoing, it will be clear that a substantial advance has been made in this art by providing an improved method and apparatus for producing molded articles from plastic rubber, and that the invention is adapted to be practiced with economy. The molded heel blanks are accurate as to size and shape and require no individual handling. As the filled molds are delivered from in front of the extruding machine, they are ready for the next step in the manufacturing process, which may be either the application of inserts of various kinds or immediate vulcanizing. While the invention has been illustrated and described as specifically adapted for the production of rubber heels, it is not restricted to such use, since the salient features are not dependent upon the shape or proportions of the cavities, and since the invention is susceptible of modification in the details of construction and arrangement of parts, the right is herein reserved to make such changes as fall within the scope of the appended claims without departing from the spirit of the invention.

Having thus described my invention what I claim is:

1. A mold filling machine, comprising a cylinder having a die opening, a screw continuously rotatable in the cylinder for forcing plastic rubber outwardly through the die opening, a feed roller cooperating with said screw to augment the feeding pressure of the screw on the plastic rubber, means for progressively moving molds to be filled past the die opening as the screw and feed roller are rotated, and means for pressing the molds against the discharge end of the cylinder during their movement.

2. A mold filling machine, comprising a cylinder having a stock supply inlet adjacent one end and a restricted discharge opening at its other end, a screw continuously rotatable in the cylinder for forcing plastic material longitudinally therethrough, a feed roller at the stock supply inlet, said roller being rotatable to feed plastic rubber into the cylinder at a substantially constant pressure, means for conveying molds to filling positions while said screw and feed roller are rotating, whereby to successively present their cavities to the discharge opening in the cylinder, and means for pressing the molds against the discharge end of the cylinder during their movement.

3. A mold filling machine, comprising a cylinder having a die opening, a screw rotatable in the cylinder for forcing plastic rubber outwardly through the die opening, a feed roller cooperating with said screw to augment the feeding pressure of the screw on the plastic rubber, means for yieldingly supporting a mold against the discharge end of the cylinder with the mold cavities adapted for presentation to the die opening, and means for sliding the mold transversely past the die opening while maintaining the pressure on the plastic rubber.

4. A mold filling machine, comprising a cylinder having a die opening, a screw rotatable in the cylinder for forcing plastic rubber outwardly through the die opening, a feed roller cooperating with said screw to augment the feeding pressure of the screw on the plastic rubber, means to support a mold at the discharge end of the cylinder for moving in a direction transverse to the die opening, the mold having a plurality of mold cavities adapted to be filled by communication with the die opening, means for yieldingly holding the mold against the die opening as it is moved, and means for conveying the mold transversely of the die opening as the screw and roller are rotated, whereby to successively fill the mold cavities with rubber.

5. A mold filling machine for rubber heels, comprising means for extruding plastic gum stock under pressure through a restricted opening in a die plate, means for moving a mold transversely past the restricted opening, the mold having a plurality of cavities adapted to be successively brought into communication with the opening, and fluid-pressure means for maintaining the mold against the die plate during its movement.

6. A mold filling machine for rubber heels, comprising means for extruding plastic gum stock through a restricted opening in a die plate, means for supporting a flat mold with a plurality of cavities in a plane adjacent to and parallel with the die plate, the mold cavities being adapted to be brought successively into communication with the restricted opening in the die plate, fluid-pressure means for maintaining the mold in surface contact with the die plate, and a conveyor for progressively moving the mold past the die opening as the gum stock is extruded therethrough.

7. A mold filling machine for rubber heels, comprising a cylinder having a stock supply inlet adjacent one end and a die plate with a restricted discharge opening at the other end, a screw rotatable in the cylinder for propelling plastic rubber therethrough, a feed roller at the stock supply inlet to feed the rubber into the cylinder at a substantially constant pressure, spaced parallel guide members disposed in a plane adjacent and parallel to that of the die plate and adapted to support a flat mold for movement transversely of the discharge opening, the mold having successive series of cavities adapted to be brought into communication with the discharge opening, fluid-pressure means for maintaining the mold in surface contact with the die plate, and an endless belt for moving the mold on said guide members while the screw and feed roller are rotated.

8. A mold filling machine comprising a cylinder having a die opening, a screw continuously rotatable in the cylinder for forcing plastic rubber outwardly through the die opening, means for continuously supplying plastic rubber to the cylinder, means for progressively and continuously moving molds to be filled past the die opening as the screw and feed roller are rotated, and means for maintaining the molds in tight surface contact with the discharge end of the cylinder during their movement.

9. A mold filling machine for rubber heels and the like, comprising means for extruding plastic gum stock under pressure through a restricted opening in a die plate, means for moving a mold transversely past the restricted opening to bring the mold cavity into communication with the opening, and means for pressing the mold against the die plate during its movement.

10. A mold filling machine comprising means of extruding plastic gum stock through a restricted opening in a die plate, means for supporting a flat mold with a plurality of cavities in a plane adjacent to and parallel with the die plate, the mold cavities being adapted to be brought successively into communication with the restricted opening in the die plate, means for maintaining the mold in tight surface contact with the die plate, and means for progressively moving the mold past the die opening as the gum stock is extruded therethrough.

11. A mold filling machine comprising means for supporting a mold against a die plate of an extruding machine, the die plate having a restricted orifice and the mold having a plurality of mold cavities adapted for successive registration with said orifice, a rotatable screw within the extruding machine for forcing plastic rubber through the orifice in the die plate, a roller for augmenting the pressure exerted by the screw, means for sliding the mold transversely past the orifice in the die plate as the screw and roller are rotated, and means for pressing the mold firmly against the die plate during such movement.

In testimony whereof, I have affixed my signature hereto.

JOHN R. GAMMETER.